United States Patent
Hsieh

(10) Patent No.: US 10,385,612 B2
(45) Date of Patent: Aug. 20, 2019

(54) DOOR CURTAIN ANTI-DROPPING DEVICE HAVING LATCHING PIN LOCKING MECHANISM

(71) Applicant: Chung-Hsien Hsieh, New Taipei (TW)

(72) Inventor: Chung-Hsien Hsieh, New Taipei (TW)

( * ) Notice: Subject to any disclaimer, the term of this patent is extended or adjusted under 35 U.S.C. 154(b) by 6 days.

(21) Appl. No.: 15/957,960

(22) Filed: Apr. 20, 2018

(65) Prior Publication Data

US 2019/0112874 A1    Apr. 18, 2019

(30) Foreign Application Priority Data

Oct. 12, 2017    (TW) ............................... 106134930 A

(51) Int. Cl.
  *F16H 57/10*    (2006.01)
  *E06B 9/80*    (2006.01)
  (Continued)

(52) U.S. Cl.
  CPC .................. *E06B 9/80* (2013.01); *E06B 9/84* (2013.01); *F16H 1/16* (2013.01); *F16H 35/00* (2013.01);
  (Continued)

(58) Field of Classification Search
  CPC ........ E06B 9/80; E06B 9/84; E06B 2009/801; E06B 2009/802; F16H 2035/006; F16H 1/16
  See application file for complete search history.

(56) References Cited

U.S. PATENT DOCUMENTS 5,117,893 A * 6/1992 Morrison .................. E06B 9/68
                                                                  160/133
7,686,150 B2    3/2010 Hsieh
(Continued)

FOREIGN PATENT DOCUMENTS

CN    200952344 Y    9/2007
CN    202441245 U    9/2012
(Continued)

OTHER PUBLICATIONS

EP Search Report dated Nov. 16, 2018 in application No. 10201803350Q.
(Continued)

*Primary Examiner* — Jake Cook
(74) *Attorney, Agent, or Firm* — McClure, Qualey & Rodack, LLP

(57) ABSTRACT

A door curtain anti-dropping falling device for a rolling door is provided. The device comprises a worm connected to the output shaft of the door operator, a drive shaft driving the winding shaft, a worm wheel having plural oblique elongated grooves and fixedly mounted on the drive shaft and meshes with the worm, a driven wheel having plural oblique elongated holes and is driven by the worm to move synchronously with the worm wheel, a limiting disk for restricting the driven wheel from moving axially, and plural latching pins extending through the elongated holes and received in the elongated slots. Under the normal operation of the door operator, the latching pins are retained in the center positions of the elongated holes and grooves. When the worm wheel are excessively worn and dislocated from the driven wheel, the latching pins lock the worm wheel and stop the winding shaft from rotating.

8 Claims, 4 Drawing Sheets

(51) Int. Cl.
  *F16H 1/16*   (2006.01)
  *F16H 35/00*  (2006.01)
  *E06B 9/84*   (2006.01)

(52) U.S. Cl.
  CPC ... *E06B 2009/801* (2013.01); *E06B 2009/802* (2013.01); *F16H 2035/006* (2013.01)

(56) References Cited

U.S. PATENT DOCUMENTS

| | | | |
|---|---|---|---|
| 8,657,096 B2* | 2/2014 | Hsieh | E06B 9/80 188/171 |
| 9,376,864 B2 | 6/2016 | Hsieh | |
| 2002/0014314 A1* | 2/2002 | Miller | E06B 9/165 160/23.1 |
| 2017/0089134 A1* | 3/2017 | Hsieh | E06B 9/80 |

FOREIGN PATENT DOCUMENTS

| | | |
|---|---|---|
| DE | 4324866 A1 | 1/1995 |
| DE | 29502273 U1 | 9/1996 |
| EP | 0787885 A2 | 8/1997 |
| JP | 510697 | 2/1993 |
| TW | I364489 B1 | 5/2012 |
| TW | I542778 B | 7/2016 |

OTHER PUBLICATIONS

Written Opinion dated Nov. 20, 2018 in application No. 10201803350Q.

* cited by examiner

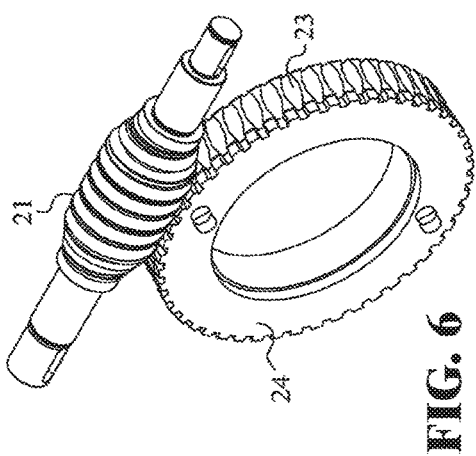
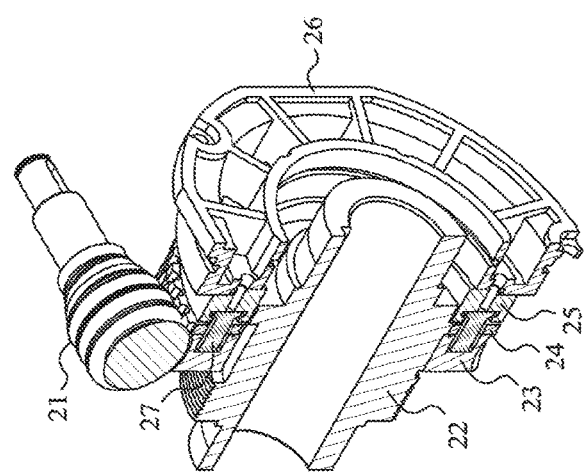
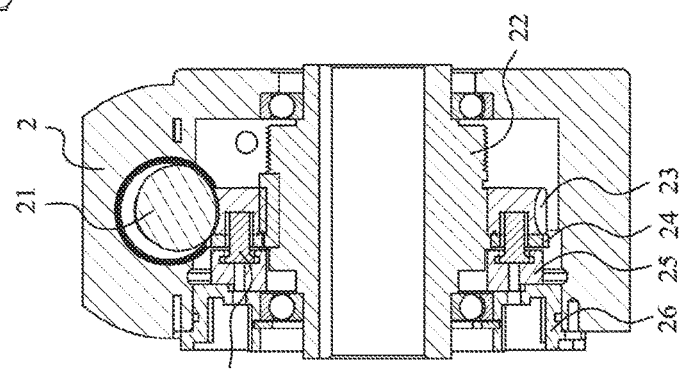
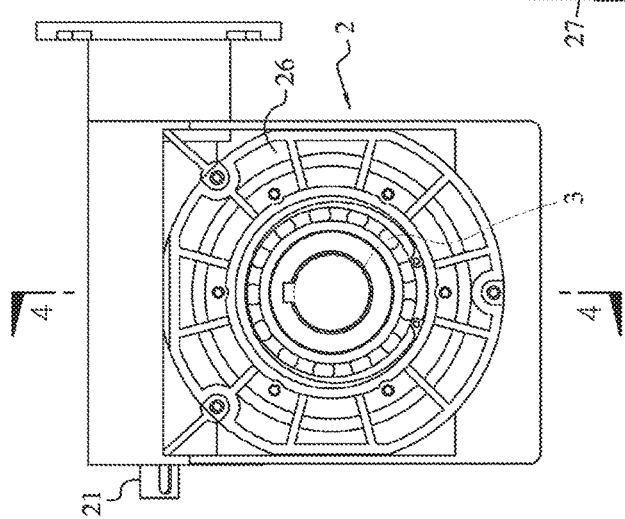

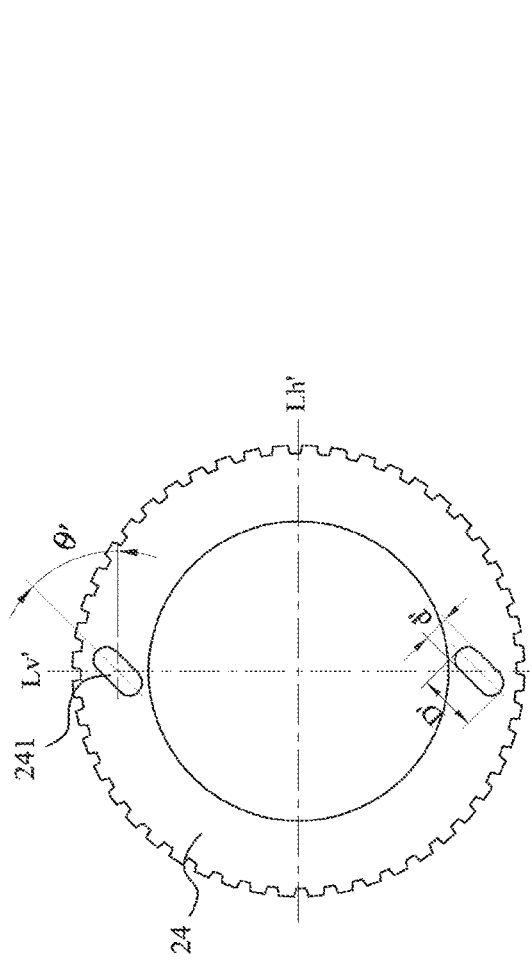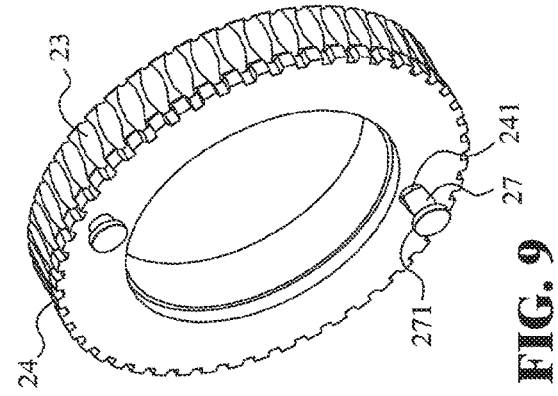

DOOR CURTAIN ANTI-DROPPING DEVICE HAVING LATCHING PIN LOCKING MECHANISM

BACKGROUND OF THE INVENTION

Field of the Invention

The present invention relates to a door curtain anti-dropping device for a rolling door, in particular an anti-dropping device which makes use of the shaft adaptation system between a door operator and a winding shaft, and is effected to lock the winding shaft by means of the latching pins in the event that the gear teeth of the worm wheel are overnworn or broken.

Description of the Related Art

In the rolling door system, a chain and sprocket are generally used as the reel mechanism between the door operator and the winding shaft. The failure rate of such mechanism is comparatively lower than that of the control mechanism or other mechanisms. As such, this mechanism is deemed as a safer mechanism, and the potential dangers underlying this mechanism are normally neglected.

The potential risk of such reel transmission formed of chain and sprocket lies in that the dropping of the door curtain as a result of power failure or chain breakage can be devastating. It is known that the improvement of the control mechanism can easily overcome the problem of free falling due to power failure can be solved by control mechanism. However, chain breakage is difficult to predict or prevent. For a small-sized door curtain, as the frequency of use is comparatively less, it is possible that chain breakage may not ever happen.

However, as to a door curtain for a huge rolling door, in particular the door curtain of the rolling door for a large-sized warehouse may weigh several tons. As the same stroke is repeated for raising and lowering the door curtain, the reel mechanism experiences repeated wear at the same spots. The wear level of the mechanism increases with the working time and the frequency of use, and the average users may be difficult to notice the extent of wear. In case the chain breaks, the fall of the door curtain under gravitation force may cause great destruction and harm.

Moreover, for the purpose of energy saving or preventing the leak of warm air, the opening and closing of the warehouse door is quite frequent. As the operating speed of the electric rolling door increases tremendously, the service life of the rolling door is shortened. Should the wears of the chain and gear reach a certain extent without effective detection, the safety of the rolling door is in question.

There are a number of literatures that provides solutions to prevent accidental dropping of the door curtain of an elevated door system. For example, DE 29 50 2273 discloses a drive member comprising a catch element held by a bolt connected to a drive worm gear. The catch element is rotatably connected to the drive worm gear and auxiliary worm gear by means of the guide bolt connected to the auxiliary worm gear. The edge of the catch element rotates the adjust element in the slot. The plastic ring in the slot is rotated by the catch element at the edge, and activates the switch when deformed, so as to disconnect the control voltage of the driving motor.

In addition, U.S. Pat. No. 7,686,150 issues to the present inventor provides a speed limit device for door comprising: an input shaft having one end coupled to the door operator, and having a first gear and a second gear. The first gear drives a hollow shaft to rotate the winding shaft of the door curtain. The second gear drives a third shaft simultaneously, and a third shaft having an active gear provided thereon. A brake device includes a clutch mechanism disposed on the hollow shaft. The clutch mechanism restrains the synchronous operation between a passive gear and the active gear. When the rotation speed of the winding shaft is abnormal, the clutch mechanism offsets to lock the winding shaft, to thereby prevent the door curtain from dropping.

In addition, U.S. Pat. No. 9,376,864 issues to the present inventor provides a door curtain anti-dropping device, which includes at least one rotating shaft, a reducer mechanism, a brake mechanism, and a rotational speed detecting module. The rotating shaft is coupled to the winding shaft for operation, so that the rotational speed of the winding shaft is reduced secondarily by the reducer mechanism to make the brake mechanism lock the winding shaft by using a small braking force. When the door operator drives the drive shaft to rotate, the rotational speed of the winding shaft is detected by the rotational speed detecting module. Once an abnormal rotational speed of the winding shaft is detected, the brake mechanism locks the winding shaft, to thereby avoid the dropping of the door curtain.

SUMMARY OF THE INVENTION

The primary object of the present invention is to provide a door curtain anti-dropping device for a rolling door having latching pin locking means for acting on the shaft adaption system between the door operator and the winding shaft. When the gear teeth of the worm wheel are broken or excessively worn, the winding shaft is locked by the latching pins so as to ensure the safety of the rolling door system.

A further object of the present invention is to provide a door curtain anti-dropping device for a rolling door that simplifies and miniaturizes the shaft transmission system between the door operator and the winding shaft, so as to reduce the manufacturing cost.

In order to achieve the above and other objects, the present invention provides an anti-dropping device having a latching mechanism which mainly includes a gear box having a force input end and a force output end, the force input end is connected to an output end of a door operator, and the force output end is connected to a winding shaft of the door curtain.

The anti-dropping device further comprises a worm, a drive shaft, a worm wheel, a driven wheel, a limiting disc, and a plurality of latching pins. The worm is disposed in a first direction of the gear box, with one end pivotally mounted on the gear box, and the other end coupled to the output shaft at the output end of the door operator.

The drive shaft is disposed along the second direction of the gear box, and the second direction is perpendicular to the first direction. One end of the drive shaft is pivoted on the gear box and the other end drives the winding shaft of the door curtain.

The worm gear is mounted on the drive shaft and meshes with the worm. A plurality of elongated slots arranged at a set angle of $\theta$ are provided on the end face of the worm wheel at some predetermined locations. The plurality of slots each has a major axis and a minor axis, with the center of the major axis passing through the radial longitudinal axis Lv of the worm wheel. Preferably, the major axis deflects by, for example, −45 degrees relative to the radial transverse axis Lh of the worm wheel. It is to be noted that this invention is not limited to the angle as described.

The driven wheel is rotatably provided on the drive shaft and located to face an opposite side of the worm wheel. The outer periphery of the driven wheel has teeth, the worm wheel and the driven wheel engage with the worm so as to be driven by the worm synchronously. A plurality of elongated holes having at least a part of the arranged at a set angle of θ' are provided on the radial end face of the driven wheel at some predetermined positions. At least a portion of the elongated holes overlaps the elongated slots.

Furthermore, the plurality of elongated holes each has a major axis and a minor axis, with the center of the major axis passes through a radial longitudinal axis Lv' of the driven wheel. Preferably, the major axis deflects by, for example, 45 degrees with respect to the radial transverse axis Lh' of the driven wheel. It is to be noted that this invention is not to be limited to the angle as described.

The limiting disc is disposed in the gear box and restricts the driven wheel from moving axially. A groove with a predetermined radius and width is provided on an end surface of the limiting disc opposite to the driven wheel.

The plurality of latching pins each includes a first end and a second end. The first end of the latching pin extends through respective hole of the driven wheel and respective slot of the worm wheel. The second end of the latching pin is held in the groove of the limiting disc.

Preferably, a pair of elongated slots are provided on diametrically opposite each other on the worm wheel, with their major axes orientated parallel to each other. A pair of elongated holes are arranged diametrically opposite each other on the driven wheel, with their major axes orientated parallel to each other. The major axis of each elongated slot and the major axis of each elongated hole are perpendicular to each other, and are orientated in opposite directions. Furthermore, the center of the major axis of each elongated hole corresponds to the center of the major axis of each elongated slot.

Preferably, the center line of the groove of the limiting disc corresponds to the center of the major axis of the elongated hole and the center of the major axis of the elongated slot. The latching pins each has a lip at the second end that projects radially outwardly. The groove of the limiting disc has a width that corresponds to the diameter of the lip, so as to allow the lip to pass through the groove. A radially inner groove is provided at the inner end of both sides of the groove in the longitudinal depth.

According to the invention, the abrasion performance of the driven wheel is set to be higher than the worm wheel. As a result, the worm wheel and the driven wheel wear are subject to different degree of wear by the action of the worm. Accordingly, when the gear teeth of the worm wheel are overworn or broken, and results in misalignment with the tooth groove of the driven wheel, each of the plurality of latching pins will be shifted to have its lips inserted into the inner groove of the limiting disc, thereby locking the worm wheel, and disabling the winding shaft of the door curtain.

As the worm has a smaller diameter and fewer gear teeth than the worm wheel, the transmission speed ratio between the worm and the worm wheel is high. Such worm and worm wheel transmission may replace the multi-stage gear reduction transmission, and provides the following advantages: fewer components, compact in structure, simple construction, miniaturize, low cost, stable in operation, low noise and low vibration.

The above and other objects, features and advantages of the present invention will become apparent with regard to the following descriptions, appended claims and accompanying drawings, in which:

BRIEF DESCRIPTION OF THE DRAWINGS

FIG. 3 is a front elevational view showing the door curtain anti-dropping device of FIG. 2;

FIG. 4 is a sectional view taken along line 4-4 of FIG. 3;

FIG. 5 is a perspective sectional view showing the door curtain anti-dropping device of the present invention, in which some of the components are omitted;

FIG. 6 is a schematic view illustrating the structural and cooperation relationship between the worm, the worm wheel and the driven wheel;

FIG. 7 is an enlarged plan view showing the worm wheel;

FIG. 8 is an enlarged plan view of the driven wheel;

FIG. 9 is a schematic view illustrating the structural and cooperation relationship between the latching pin, driven wheel and worm wheel;

FIG. 10 is a schematic view showing that the latching pin is retained in the center of the elongated slot and hole when the worm wheel and the driven wheel are moved synchronously;

DESCRIPTION OF THE PREFERRED EMBODIMENTS

Figures 1, 2:
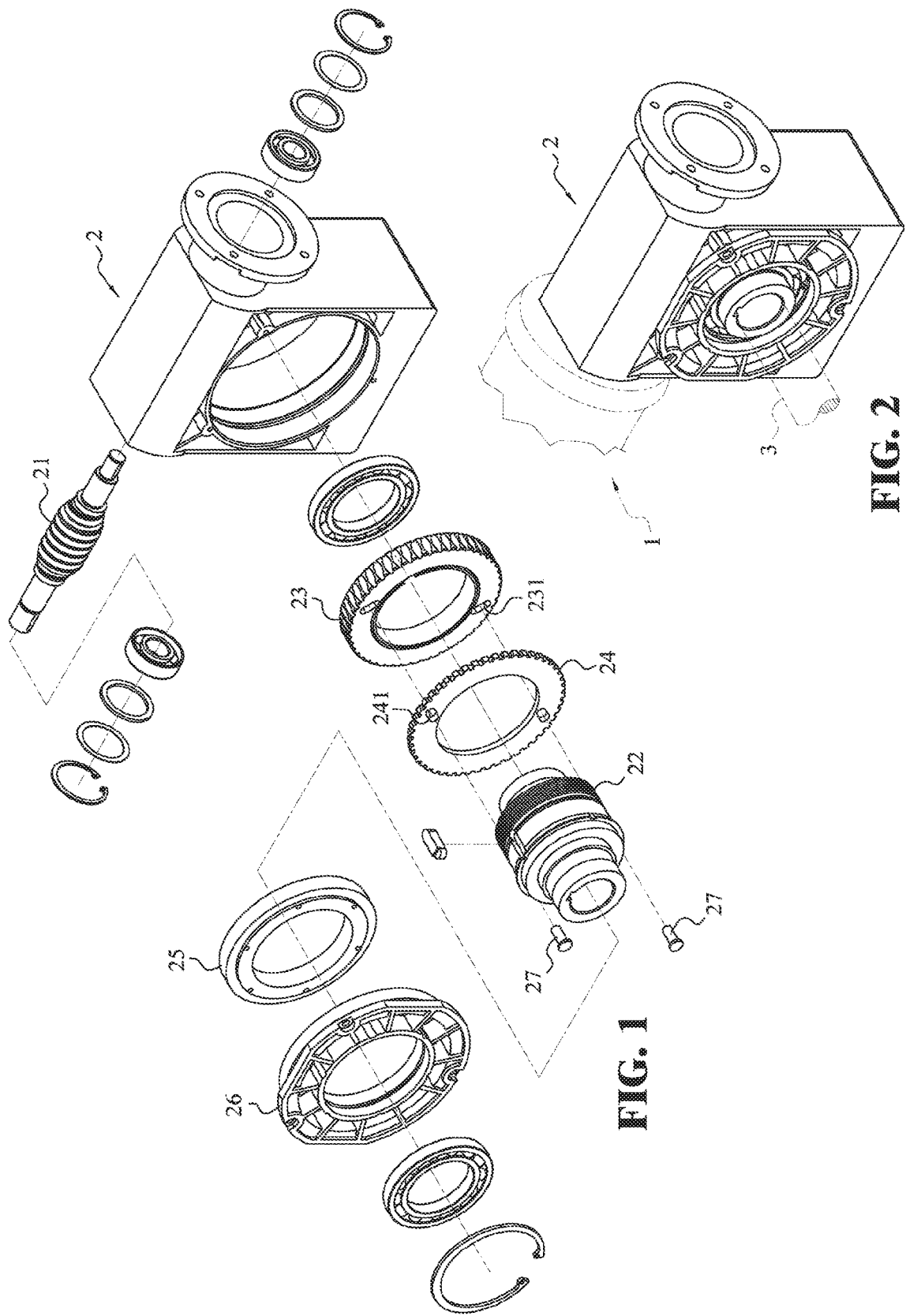
FIG. 1 is a perspective exploded view showing a preferred embodiment of a door curtain anti-dropping device according to the present invention.
FIG. 2 is a perspective view showing the door curtain anti-dropping device in assembled state.

FIGS. 1 and 2 illustrates a preferred embodiment of a door curtain anti-dropping device according to the present invention. As shown in the figures, the door curtain anti-dropping device according to this embodiment mainly comprises a gear box 2 having an input end connected to an output end of a door operator 1, and an output end connected to a winding shaft 3 of the door curtain. As the present invention does not involve improvement in the basic structure of the rolling door system, details of the rolling door system are omitted.

With reference to FIGS. 1-6, the door curtain anti-dropping device according to the present invention further includes a worm 21, a drive shaft 22, a worm gear 23, a driven wheel 24, a limiting disc 25, and a front cover 26. The worm 21 is arranged in the first direction of the gear box 2, and is axially provided thereon with helical tooth grooves. The worm 21 has one end pivotally mounted ion the gear box 2, and the other end coupled to an output shaft (not shown) of the door operator 1.

The drive shaft 22 is arranged in the second direction of the gear box 2, which is perpendicular to the first direction. As such, the axis of the drive shaft 22 and the axis of the worm 21 are perpendicular to each other. The drive shaft 22 has one end pivotally mounted to the gear box 2, one other end for driving the winding shaft 3 of the door curtain.

The worm wheel 23 is fixed to the drive shaft 22 via, for example, a key member. The outer periphery of the worm wheel 23 is provided with tooth grooves having a predetermined reduction ratio to mate with the worm 21. The worm wheel 23 has a plurality of elongated slots 231 on the radial end face at some predetermined positions. Each of the elongated slots 231 has a major axis and a minor axis, and is arranged at a setting angle of θ (as shown in FIG. 7).

The driven wheel 24 is rotatably mounted on the drive shaft 22, and faces the worm wheel 23. The driven wheel 24 has teeth corresponding to the gear teeth of the worm wheel 23 at the outer periphery thereof, and are in mesh with the worm 21 so as to be driven by the worm. The driven wheel 24 has a plurality of elongated holes 241 on the radial end face at some predetermined positions. Each of the elongated holes 241 has a major axis and a minor axis, and is arranged at a setting angle of θ' (as shown in FIG. 8).

The limiting disc 25 is disposed in the gear box 2 along with the front cover 26. As shown in FIG. 4, the front cover 26 is fixed to the gear box 2. The limiting disc 25 is arranged between the driven wheel 24 and the front cover 26, and is securely and non-rotatably connected to the front cover 26. The limiting disc 25 allows the driven wheel 24 to rotate but restricts it from moving axially. A groove 251 with a predetermined radius r and width is provided on end surface of the limiting disc 25 opposite to the driven wheel 24 (see FIG. 10).

The plural latching pins 27 each includes a first end and a second end. The first end extends through respective elongated hole 241 of the driven wheel 24, and respective elongated slot 231 of the worm wheel 23 to rest in respective slot 231. The second end rests in the groove 251 of the limiting disc 25.

Further referring to FIG. 7, the elongated slots 231 of the worm wheel 23 each includes a major axis D in a long axis direction, and a minor axis d in a short axis direction. The center of the major axis D passes through the radial longitudinal axis Lv of the worm wheel 23. The major axis D deflects with respect to the radial transverse axis Lh of the worm wheel 23 by an angle θ, which may include −45 degrees, but is not limited thereto. The deflection direction and angle as shown are for reference only. Preferably, a pair of elongated slots 231 are provided diametrically opposite each other on the worm wheel 23, and the major axes D of the elongated slots 231 are parallel to each other.

Referring to FIG. 8, the plural elongated holes 241 of the driven wheel 24 each includes a major axis D' in a long axis direction, and a minor axis d' in a short axis direction. The center of the major axis D' passes through the radial longitudinal axis Lv' of the driven wheel 24. The major axis D' deflects relative to the radial transverse axis Lh' of the driven wheel 24 by an angle θ', which may include 45 degrees, but is not limited thereto. The deflection direction and angle as shown are merely for reference. Preferably, a pair of elongated holes 241 are provided diametrically opposite each other on the driven wheel 24, and the major axes D' of the elongated holes 241 are parallel to each other.

The major axis D of each elongated slot 231 and the major axis D' of each elongated hole 241 are oriented opposite and perpendicular to each other. Furthermore, the center of the major axis D' of the hole 241 corresponds to the center of the major axis D of the slot 231, and at least a portion of the hole 241 overlaps the slot 231 (as shown in FIGS. 9 and 10).

Figure 11:
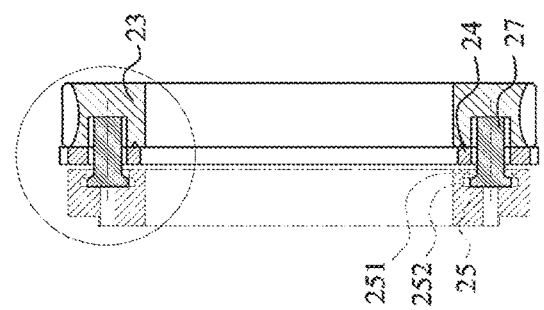
FIG. 11 is a sectional view taken along line 11-11 of FIG. 10, wherein the phantom line indicates the combination relationship of the limiting disc.
Figure 11A:
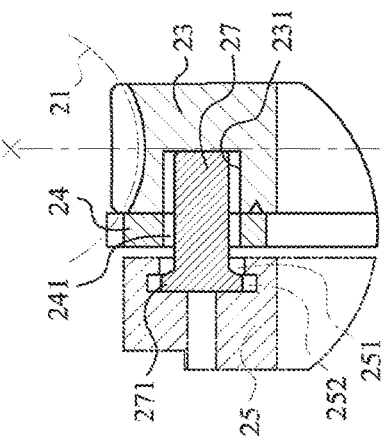
FIG. 11a is a partial enlarged view showing the circled portion of FIG. 11.

Referring to FIGS. 10, 11 and 11a, the centerline of the groove 251 of the limiting disc 25 corresponds to the center of the major axis D' of the hole 241, and the center of the major axis D of the slot 231. Further, each latching pin 27 has a lip 271 projecting radially outwardly from the end portion of the second end. The width of the groove 252 of the limiting disc 25 corresponds to the diameter of the lip 271, allowing the lip 271 to pass through the groove 252. The groove 251 is provided with radially inner grooves 252 at both sides.

According to the present invention, when the door operator drives the winding shaft under normal condition, the driven wheel 24 and the worm wheel 23 are driven at the same time by the lead angle of the worm 21, the first end of each latching pin 27 is retained in the center positions of the elongated hole 241 and elongated slot 231, while the second end of each latching pin 27 is retained in the center position of the groove 251 of the limiting disc 25.

Figure 12:
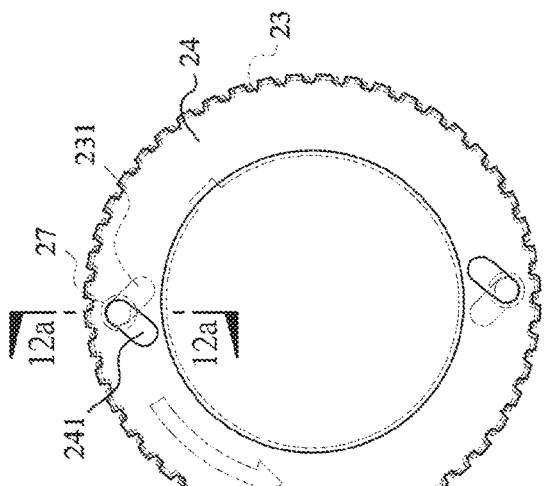
FIG. 12 is a schematic view showing an assumed condition in which the driven wheel is in misalignment with the worm wheel, and the imaginary arrow indicates the displacement position of the latching pin when the driven wheel rotates in the counterclockwise direction and overpasses the worm wheel.
Figure 12A:
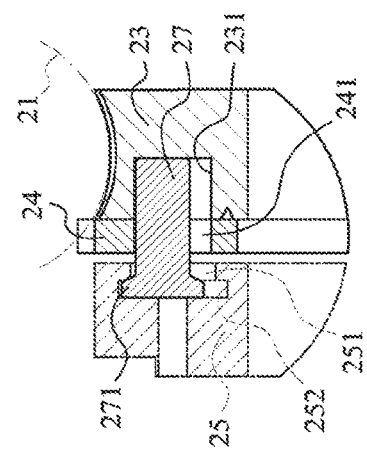
FIG. 12a is a partial, enlarged cross-sectional view taken along line 12a-12a of FIG. 12.

Referring to FIG. 12 and FIG. 12a, as the wear of the gear pairing worm/worm wheel will increase with the working time and the frequency of use, the mating between the worm 21 and the worm wheel 23 gradually deteriorates. In the event of breakage of gear teeth due to overworn, the worm 21 may not be able to drive the worm wheel 23, and a retardation may occur. At the same time, as the driven wheel 24 is driven persistently by the worm 21, the driven wheel tends to pass over, resulting in a misalignment of the tooth slots of the worm wheel and driven wheel. In turn, the latching pins will be displaced.

For example, in the event that the driven wheel 24 rotates counterclockwise to pass the worm wheel 23, as shown by the arrow indicated by the phantom line in FIG. 12, as the latching pin 27 is dragged by the elongated hole 241 and the elongated slot 231, the intersection point between the two moves upward, and renders the first end of the latching pin 27 to translate to the upper edge of the hole 241 and slot 231. At the same time, the lip 271 at the second end of the latching pin 27 is embedded in the inner groove 252 at the upper edge of the groove 251 of the limiting disc 25. Consequently, a locking effect is achieved (as shown in FIG. 12a), and the winding shaft cannot be wound and the door curtain will not drop.

Figure 13:
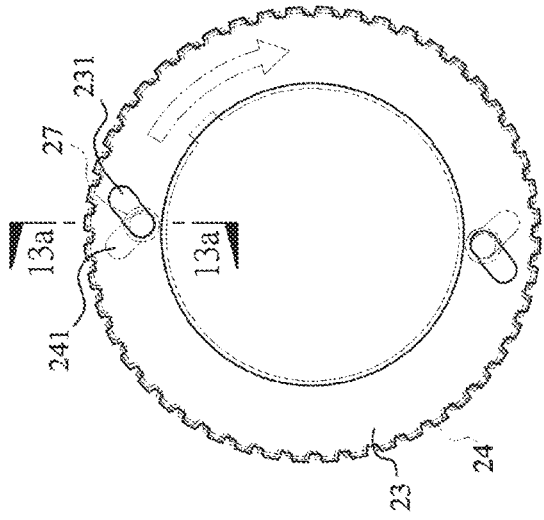
FIG. 13 is a schematic view showing an assumed condition in which the driven when is in misalignment with the worm wheel, wherein the imaginary arrow indicates the displacement position of the latching pin when the driven wheel rotates clockwise and overpass the worm wheel.
Figure 13A:
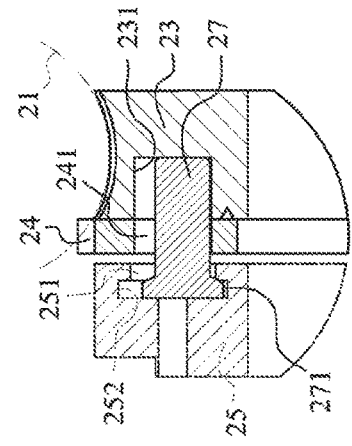
FIG. 13a is a partial, enlarged cross-sectional view taken along line 13a-13a of FIG. 13.

For example, in the event that the driven wheel 24 rotates clockwise to pass the worm wheel 23, as shown by the arrow in the phantom line in FIG. 13, as the latching pin 27 is dragged by the elongated hole 241 and the elongated slot 231, the intersection point between the two moves downward, and renders the first end of the latching pin 27 to translate to the lower edge of the hole 241 and slot 231. At the same time, the lip 271 at the second end of the latching pin 27 is embedded in the inner groove 252 at the lower edge of the groove 251 of the limiting disc 25. Consequently, a locking effect is achieved (as shown in FIG. 13), and the winding shaft cannot be wound and the door curtain will not drop. In addition, when the winding shaft is locked and cannot be wound, the circuit current of the door operator will go overload, and the overload switch deactivated, to thereby ensure safety.

While the preferred embodiments have been described as above, it is to be noted that the preferred embodiments are not intended to restrict the scope of implementation of the present invention. Modifications and variations to the embodiments can be made without departing from the spirit and scope of the claims of this application.

What is claimed is:

1. A door curtain anti-dropping device for a rolling door comprising: at least a gear box having a force input end connected to an output end of a door operator, and a force output end connected to a winding shaft of a door curtain; the anti-dropping device further comprising:
   a worm disposed in a first direction of the gear box, the worm having one end pivotally mounted on the gear box, and the other end coupled to an output shaft of the output end of the door operator;
   a drive shaft disposed in a second direction of the gear box, the drive shaft having one end pivotally mounted on the gear box, and the other end driving the winding shaft of the door curtain;
   a worm wheel with a plurality of gear teeth fixedly mounted on the drive shaft, and having a plurality of elongated slots arranged at a set angle (θ) on one end face at predetermined positions;
   a driven wheel rotatably mounted on the drive shaft and having one side facing the worm wheel, the driven wheel having a plurality of teeth, the worm wheel and the driven wheel being in engagement with and driven by the worm synchronously; the driven wheel having a plurality of elongated holes arranged at another set angle (θ') on a radial end face at predetermined positions, and at least a portion of the elongated holes overlaps the corresponding elongated slots;
   a limiting disc fixedly mounted to the gear box to restrict the driven wheel from moving axially, and having a groove with a predetermined radius and width on an end face facing the driven wheel; and
   a plurality of latching pins each having a first end extending through the respective elongated hole of the driven wheel and accommodated in the respective elongated slot of the worm wheel, and a second end accommodated in the groove of the limiting disc; wherein
   when the gear teeth of the worm wheel are excessively worn or broken, and results in misalignment with the teeth of the driven wheel, the latching pins translate to be received in the groove of the limiting disc, thereby locking the worm wheel and prohibiting the winding shaft of the door curtain from rotating.

2. The door curtain anti-dropping device as claimed in claim 1, wherein the elongated slots each comprises a minor axis and a major axis having a center passing through a radial longitudinal axis (Lv) of the worm wheel, and the major axis deflects by a predetermined angle with respect to a radial transverse axis (Lh) of the worm wheel.

3. The door curtain anti-dropping device as claimed in claim 2, wherein a pair of elongated slots are provided diametrically opposite each other on the worm wheel, and the major axes of the elongated slots are parallel to each other.

4. The door curtain anti-dropping device as claimed in claim 1, wherein the elongated holes each comprises a minor axis and a major axis having a center passing through a radial longitudinal axis (Lv') of the driven wheel, and the major axis deflects by a predetermined angle with respect to a radial transverse axis (Lh') of the driven wheel.

5. The door curtain anti-dropping device as claimed in claim 4, wherein a pair of elongated holes are provided diametrically opposite to each other on the driven wheel, and the major axes of the elongated holes are parallel to each other.

6. The door curtain anti-dropping device as claimed in claim 1, wherein the major axis of the elongated slot and the major axis of the elongated hole are perpendicular to each other, and are orientated in opposite direction, and the center of the major axis of the elongated hole corresponds to the center of the major axis of the elongated slot.

7. The door curtain anti-dropping device as claimed in claim 6, wherein a center line of the groove of the limiting disc corresponds to the center of the major axis of each elongated hole and the center of the major axis of the elongated slot.

8. The door curtain anti-dropping device as claimed in claim 7, wherein the latching pins each includes a lip projecting radially outwardly from the second end; the groove of the limiting disc has a width corresponding to the diameter of the lip, thereby allowing the lip to pass through the groove, and a radial inner groove is provided at the inner end of both sides of the groove longitudinally.

* * * * *